US012145640B2

(12) United States Patent
Van Der Schrieck et al.

(10) Patent No.: US 12,145,640 B2
(45) Date of Patent: Nov. 19, 2024

(54) DEVICE FOR DETECTING A WHEEL ON A RAIL TRACK

(71) Applicant: BUILD CONNECTED B.V., The Hague (NL)

(72) Inventors: Maarten Pim Van Der Schrieck, Heemstede (NL); Reinier Willem Heeres, Gometz-la-Ville (FR); Wichert Jan Kranenburg, The Hague (NL)

(73) Assignee: BUILD CONNECTED B.V., The Hague (NL)

( * ) Notice: Subject to any disclaimer, the term of this patent is extended or adjusted under 35 U.S.C. 154(b) by 164 days.

(21) Appl. No.: 17/624,709

(22) PCT Filed: Jun. 25, 2020

(86) PCT No.: PCT/EP2020/067836
§ 371 (c)(1),
(2) Date: Jan. 4, 2022

(87) PCT Pub. No.: WO2021/004800
PCT Pub. Date: Jan. 14, 2021

(65) Prior Publication Data
US 2022/0250666 A1    Aug. 11, 2022

(30) Foreign Application Priority Data
Jul. 5, 2019   (NL) ...................................... 2023451

(51) Int. Cl.
*B61L 25/02*   (2006.01)
*B61L 27/57*   (2022.01)
(Continued)

(52) U.S. Cl.
CPC ............. *B61L 25/023* (2013.01); *B61L 27/57* (2022.01); *G01P 13/04* (2013.01); *B61L 2205/00* (2013.01)

(58) Field of Classification Search
CPC .......... B61L 25/02; B61L 27/57; B61L 23/34; G01P 13/04; G01R 13/00; G06F 15/00
See application file for complete search history.

(56) References Cited

U.S. PATENT DOCUMENTS 3,941,338 A    3/1976 Knudsen
4,236,093 A    11/1980 Birnbaum
(Continued)

FOREIGN PATENT DOCUMENTS

DE           823151 C      11/1951
DE      102010033953 A1     2/2012
(Continued)

OTHER PUBLICATIONS

Pointner et al., "Reliable wheel sensors as the basis for highly available systems", Signalling + Data Communication, 2017, pp. 49-58, vol. 109, No. 4.

*Primary Examiner* — Neel D Shah
(74) *Attorney, Agent, or Firm* — The Webb Law Firm

(57) ABSTRACT

Disclosed are a method and device for detecting a direction of motion of a wheel on a rail track. The device includes at least one magnet for providing a magnetic field; a magnetic field sensor for sensing a magnetic field value indicative for a flux density, or a change in the flux density of the provided magnetic field; and at least one processor in communication with the magnetic field sensor. The at least one processor is configured to: obtain a plurality of the magnetic field values for respective times from the magnetic field sensor; and to analyse the obtained plurality of magnetic field values such that a direction of motion of a wheel passing the device is obtained.

30 Claims, 8 Drawing Sheets

(51) Int. Cl.
    *G01P 13/04*         (2006.01)
    *G01R 13/00*         (2006.01)
    *G06F 15/00*         (2006.01)

(56) References Cited

U.S. PATENT DOCUMENTS

| | | | |
|---|---|---|---|
| 4,524,932 | A | 6/1985 | Bodziak |
| 6,899,303 | B2 | 5/2005 | Shams |
| 7,481,400 | B2 | 1/2009 | Appleby et al. |
| 8,423,240 | B2 | 4/2013 | Mian |
| 2003/0205998 | A1* | 11/2003 | Heremans ............... G01D 5/147 324/165 |
| 2005/0258820 | A1 | 11/2005 | Forster |
| 2007/0001059 | A1* | 1/2007 | Appleby ................. B61L 1/165 246/122 R |
| 2010/0235123 | A1 | 9/2010 | Bartonek |
| 2018/0201286 | A1 | 7/2018 | Oldewurtel |
| 2019/0086364 | A1 | 3/2019 | Hay et al. |
| 2019/0094181 | A1 | 3/2019 | Paulson |

FOREIGN PATENT DOCUMENTS

| | | |
|---|---|---|
| EP | 1362759 A1 | 11/2003 |
| GB | 1242218 A | 8/1971 |
| NL | 2017659 B1 | 4/2018 |
| NL | 2023451 B1 | 2/2021 |
| WO | 2010000850 A1 | 1/2010 |
| WO | 2017045888 A1 | 3/2017 |

\* cited by examiner

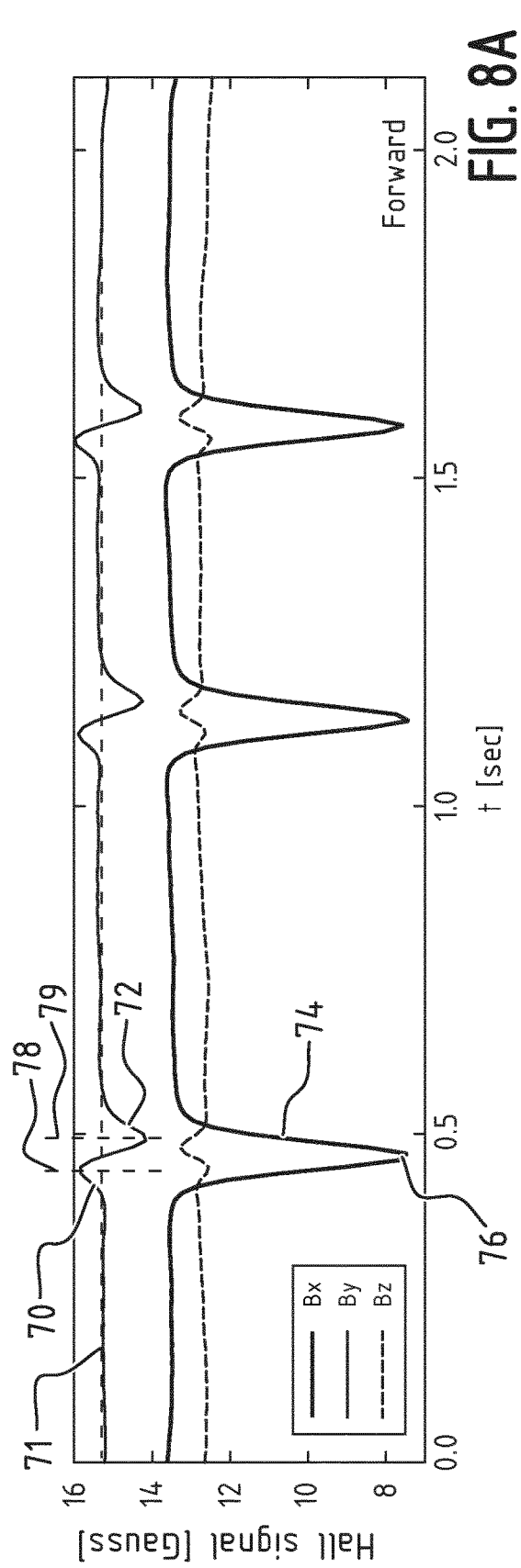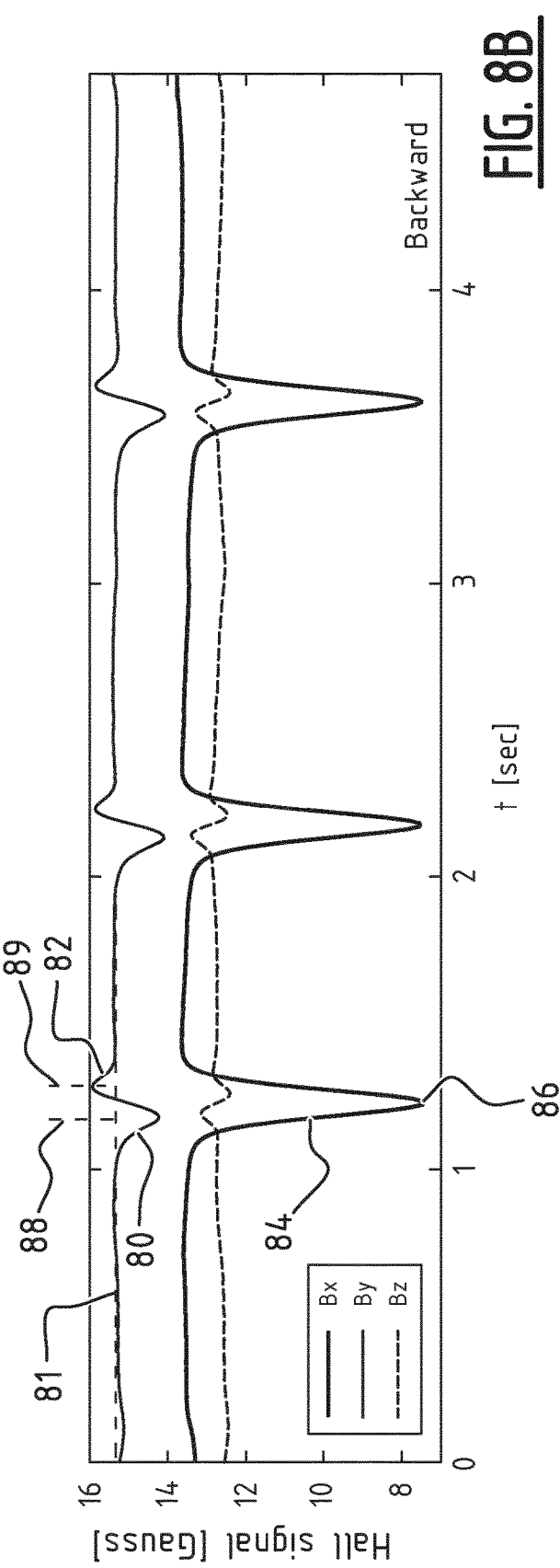

DEVICE FOR DETECTING A WHEEL ON A RAIL TRACK

CROSS-REFERENCE TO RELATED APPLICATIONS

This application is the United States national phase of International Application No. PCT/EP2020/067836 filed Jun. 25, 2020, and claims priority to The Netherlands Patent Application No. 2023451 filed Jul. 5, 2019, the disclosures of which are hereby incorporated by reference in their entirety.

BACKGROUND OF THE INVENTION

Field of the Invention

The present patent disclosure concerns a device for detecting a wheel on a rail track, a method for detecting a train wheel and a computer program product for detecting a train wheel.

Description of Related Art

In many applications concerning rail tracks, such as in rail transport with trains, it is beneficial to obtain information on the whereabouts of train vehicles. Many marshalling yards, especially those without electrified systems, lack safety systems.

Detection of wheels on a rail track using e.g. a Hall effect device is shown for instance in U.S. Pat. No. 4,524,932 A. Here the Hall effect device is to be placed in a pole-to-pole hole drilled through a permanent magnet to create a magnetic flux null in order to avoid saturating the Hall element. The detector is configured to detect the passing of railroad car wheels along the track by the change in the flux level from the permanent magnet. With this single apparatus, it is impossible to detect in which direction a passing train is going.

Patent documents US 2007/0001059 A1 and WO 2017/045888 A1 are examples of where multiple sensors are used to determine a direction and speed of train vehicles.

Patent document EP 1 362 759 A1 describes a train wheel sensor comprising a first coil that generates an alternating magnetic field and a second coil of equal area that is axially aligned to the first coil to produce two alternating magnetic fields in opposite direction in order to evaluate the presence and movement direction of the train wheel.

Patent document US 2010/235123 A1 concerns an example of a method of locating a wheel of a rail vehicle.

SUMMARY OF THE INVENTION

It is an object among objects of the present patent disclosure to improve the detection of wheels on a rail track.

According to a first aspect, there is provided a device for detecting a direction of motion of a wheel on a rail track, the device being configured to be placed on or near a lateral side of the rail track, the device comprising:
  at least one magnet for providing a magnetic field;
  a magnetic field sensor for sensing a magnetic field value indicative for a flux density, or a change in the flux density, of the provided magnetic field;
  at least one processor in communication with the magnetic field sensor, wherein the at least one processor is configured to:
    obtain a plurality of the magnetic field values for respective times from the magnetic field sensor; and to
    analyse the obtained plurality of magnetic field values such that a direction of motion of a wheel passing the device is obtained.

By this method, it is possible to obtain the direction of motion of the wheel passing the device. In this way, it becomes possible to keep track of vehicles on the rail system. For instance, when more devices are placed at several locations of a marshalling yard, it becomes possible to keep a database of incoming and outgoing trains.

When a wheel passes nearby the at least one magnet, the wheel acts as a magnetic shunt, or magnetic field blocking or altering element. In other words, the magnetic field lines generated by the at least one magnet are short circuited. As the wheel passes, the magnetic field component will first decrease or increase (depending on the position of the sensor and from which side the wheel is approaching relative to the sensor) and then resp. increase or decrease. These two different possibilities respectively indicate respective directions of motion of the wheel.

In addition, due to the presence of the magnet in the vicinity of the sensor, and the device being placeable in the vicinity of the wheel passing location along the rail, the device provides a non-uniform magnetic field in and around the device, such that even the direction of motion of symmetrical (in the direction of motion) objects such as a wheel can be detected. For these latter objects, their directions of motion would be harder to detect, or even not be detectable, in a uniform magnetic field such as the Earth magnetic field at the Earth's surface.

In general, the skilled person will understand, after reading the present disclosure, that the above aspect, embodiments and teachings of this disclosure can be applied to other fields outside of rail vehicles, wherein the wheel would instead be any object that influences the magnetic field of the at least one magnet, and where the magnetic field sensor senses the effect on the local magnetic field.

In an embodiment, the processor is configured to analyse the obtained plurality of magnetic field values such that a direction of motion of a wheel passing the device is obtained by comparing the plurality of magnetic field values with a base line magnetic field value sensed by the magnetic field sensor when no wheel is present to detect a relative increase and subsequent decrease, or a relative decrease and subsequent increase of the plurality of magnetic field values compared to the base line magnetic field value. The relative increase and decrease are preferably substantial, wherein substantial may for instance indicate that the relative increase and decrease are at least twice the noise level of the magnetic field values. That the relative increase and decrease are substantial may additionally or alternatively indicate that the relative increase and decrease are at least twice the combined value of sensor noise and other magnetic influences such as magnetomechanical effects (see below), remanent magnetic fields of the passing vehicle/wheels and disturbance of the earth magnetic field.

In another embodiment, the comparing comprises detecting whether at a first point in time one of the plurality of magnetic field values is larger than the base line magnetic field value and at a second point in time after the first point in time another one of the plurality of magnetic field values is smaller than the base line magnetic field value in order to determine that the wheel passing the device has a first direction of motion; and detecting whether at a first point in time one of the plurality of magnetic field values is smaller than the base line magnetic field value and at a second point in time after the first point in time another one of the plurality of magnetic field values is larger than the base line magnetic field value in order to determine that the wheel passing the device has a second direction of motion different from the first direction of motion. This provides a robust way of determining the direction of motion.

In yet another embodiment, wherein the comparing comprises detecting whether a first difference between a first value of the plurality of magnetic field values and the base line magnetic field value is larger than a first threshold value above the base line magnetic field value or lower than a second threshold value below the base line magnetic field value; when the first difference is larger than the first threshold value, detecting whether a second difference between a second value of the plurality of magnetic field values and the base line magnetic field value is lower than a third threshold value, the second value corresponding to a later point in time than the first value, in order to determine that the wheel passing the device has a first direction of motion; and when the first difference is smaller than the second threshold value, detecting whether a second difference between a second value of the plurality of magnetic field values and the base line magnetic field value is larger than a fourth threshold value, the second value corresponding to a later point in time than the first value in order to determine that the wheel passing the device has a second direction of motion different from the first direction of motion. This embodiment provides an especially robust way of determining the direction of motion of the wheel passing the device.

The magnetic field sensor is preferably configured to sense the magnetic field value in a sensing direction that is substantially different from the direction of the magnetic field present at the position of the sensor in a resting state, i.e. a state where no wheel is influencing the magnetic field provided by the at least one magnet. The sensing direction may be perpendicular to the direction of the magnetic field present at the position of the sensor in a resting state. In this perpendicular sensing direction, when a wheel passes nearby the at least one magnet, the wheel acting as a magnetic shunt has the largest effect on the magnetic field.

In another embodiment, the magnetic field sensor is preferably configured to sense the magnetic field value in a sensing direction with the largest magnetic field value change when the at least one magnet is shunted by the presence of a wheel.

The at least one magnet is preferably a permanent magnet, since this requires less power and allows the device to operate wirelessly over long times, in the order of at least one year up to even six or more years.

The wheel is preferably partially or fully of a material that influences the magnetic field provided by the at least one magnet, such as ferromagnetic materials such as various steels or cast iron. Most train wheels are made of steel. Most train wheels comprise a flange on one side to keep the wheels, and hence the train, running on the rails. The device is preferably configured and especially suitable for detecting the flange passing near the device, e.g. within 10 cm, preferably within 5 cm or 2 cm.

The sensor is preferably placed distanced from an outer surface of the at least one magnet, more preferably at the lateral side of or below the at least one magnet. In an embodiment, the magnetic field sensor is positioned such that it is outside a point of symmetry of the at least one magnet and a longitudinal direction of the rail track when the device is placed on or near the lateral side of the rail track.

Preferably, when the at least one magnet is positioned such that its magnetic pole axis is perpendicular to a longitudinal direction of the rail track when the device is placed on or near the rail track, the magnetic field sensor is placed adjacent to the magnetic pole axis. This avoids placing the sensor in a position that is symmetric compared to the magnetic field provided by the at least one magnet and the motion path of the wheel (viz. along the longitudinal direction of the rail). The lateral position of the sensor compared to the magnet is one example position allowing the detection of the direction of motion of the wheel using a single magnet and a single magnetic field sensor.

In an embodiment, the at least one processor is further configured to detect whether at least one of the obtained plurality of magnetic field values meets a condition indicating the presence of a wheel on the rail track, wherein the at least one processor is configured to only obtain a direction of the wheel when the obtained magnetic field value meets the condition indicating the presence of a wheel on the rail track. This implementation saves required power for running the device.

Preferably, the condition indicating the presence of a wheel on the rail track is a condition of exceeding a predetermined fifth threshold value of an absolute value of a difference between at least one value of the plurality of magnetic field values and a base line magnetic field value sensed by the magnetic field sensor when no wheel is present.

In another embodiment, the device comprises a first and a second magnet for providing the magnetic field, wherein the first and second magnets are distanced from each other by a first distance, wherein the magnetic field sensor is positioned such that it is capable of sensing the magnetic field originating of both the first and the second magnet. When two magnets are used, which is preferred, the sensor is preferably placed in between the two magnets relative to the longitudinal direction of the rail onto a side of which the device is placeable.

Preferably, the magnetic field sensor is positioned at a position where a first magnetic field direction of a magnetic field component or vector of the first magnet is different from a second magnetic field direction of a magnetic field component or vector of the second magnet. In this way, when the wheel approaches and subsequently blocks the magnetic field generated by at least one of the two magnets, the sensor will measure a large increase and subsequent drop (or vice versa) of the magnetic field flux density, allowing for more accurate determination of the direction of motion. It will be understood that a wheel blocking the magnetic field is an example of altering the magnetic field.

The embodiment of the device having a first and a second magnet is also suitable to more generally detect the presence of a wheel with a higher accuracy than in the prior art. It is not required to also measure the direction of motion of the passing wheel. Thus, according to another aspect, instead of analysing the obtained plurality of magnetic field values such that a direction of motion of a wheel passing the device is obtained, the device having at least two magnets is instead at least configured to analyse the obtained plurality of magnetic field values such that at least the presence of a wheel passing the device is obtained. It is also in general possible to measure, with an increased accuracy, the speed of the passing wheel by analysing the plurality of magnetic field values. It will be understood that the described (preferred) embodiments above and below concern embodiments of any of the possible aspects described herein.

Preferably, the first and second magnets are positioned such that magnetic pole directions of the first and second magnets are substantially anti-parallel. When the sensor is placed equally distanced in between the first and second magnets and the first and second magnets have approximately or substantially the same strength, the preferred sensing direction is substantially or approximately parallel to the pole directions of the first and second magnets.

Alternatively, the first and second magnets are positioned such that magnetic pole directions of the first and second magnets are substantially parallel. When the sensor is placed equally distanced in between the first and second magnets and the first and second magnets have approximately or substantially the same strength, the preferred sensing direction is substantially or approximately perpendicular to the pole directions of the first and second magnets.

Anti-parallel is preferred, since this results in a larger effect on the magnetic field in the sensing direction, increasing the accuracy and/or precision of the device.

In an embodiment, the device comprises a base and a top side opposite the base, wherein the first and second magnets are positioned substantially parallel to the top side, wherein magnetic pole directions of the first and second magnets are substantially perpendicular to the top side. In this way, the wheel, when passing the top side at a distance of e.g. 5 cm, has the largest influence on the magnetic field lines generated by the magnets.

In an embodiment, the first distance is in the range of 20 to 200 mm, wherein the magnetic field sensor is preferably positioned at substantially equal respective distances from the first and second magnets.

In an embodiment, the magnetic field sensor is configured to sense the flux density or change in the flux density in a range of −50 to +50 gauss. The magnetic sensitivity of the magnetic field sensor is preferably smaller than 10 mgauss, more preferably smaller than 5 mgauss, for instance 1, 1.5 or 2 mgauss.

In an embodiment, the magnetic field provided by the at least one magnet is substantially larger (e.g. at least 2× or at least 10× larger) than the average magnetic field of Earth. Preferably, at the position of the magnetic field sensor, the at least one magnet provides a flux density of at least 1.5 gauss. It is preferred that the at least one magnets has a remanence of at least 5000 gauss, preferably at least 8000 gauss, more preferred at least 12000 gauss. With these magnets, it is in particular beneficial to measure the wheel at a distance of about 10 to 50 mm from the magnets in the device. More in particular the combination of the above preferred magnetic field sensors in combination with these magnets provides a particularly suitable device for accurately measuring the presence, speed, velocity, and/or direction of motion of wheels passing the device.

In an embodiment, the at least one magnet is configured such that the provided magnetic field is at least partially influenced by the wheel when the wheel is passing the device at a distance of at most 10 cm, wherein the magnetic field sensor is positioned such that it senses the change in magnetic field caused by the wheel. The exact position of the magnetic field sensor can change, depending on the used magnets, distance from the wheel (flange), position of the magnetic field sensor relative to the magnets, etc., as will be understood by one skilled in the art.

Preferably, the magnetic field sensor is distanced from the at least one magnet by a second distance that has a similar or same order of magnitude as a third distance between the at least one magnet and a nearest position of the wheel when the wheel passes the device when positioned on or near the rail track. With this positioning scheme, different magnets of different sizes, as well as the magnetic field sensor, can be placed suitably in the device for obtaining accurate measurements.

In a further embodiment, the magnetic field sensor is a two dimensional magnetic field sensor that senses two components of the magnetic field in first and second perpendicular sensing directions, wherein the processor is configured to obtain respective first and second pluralities of the magnetic field values for respective times from the magnetic field sensor for each respective first and second sensing direction;

analyse the obtained first plurality of magnetic field values by detecting whether the magnetic field values drop below a threshold value (sixth threshold value), or rise above a threshold value (seventh threshold value), indicating the presence of a wheel on the rail track passing the device;

when the presence of a wheel is detected, analysing the second plurality of magnetic field values to determine the direction of motion of the wheel.

This embodiment is particularly beneficial since the change in one of the sensing directions is typically larger than the other, while the other sensing direction is sensitive to the direction from which the wheel is approaching the device (and thereafter distancing from the device).

It is preferred that the at least one processor is configured to analyse the second plurality of magnetic field values to determine the direction of motion of the wheel by estimating a peak position in the first plurality of magnetic field values, the peak position indicating a moment in time when the wheel is substantially above the device; determine a sign of a first derivative of the second plurality of magnetic field values near the estimated peak position; when the determined sign of the first derivative is positive, determining the direction of motion of the wheel to be in a first direction along the rail track; and when the determined sign of the first derivative is negative, determining the direction of motion of the wheel to be in a second direction along the rail track. It will be understood, in view of this entire disclosure, that peak position may here indicate dip position.

This preferred embodiment allows for the determining of the direction of motion of the wheel with a low amount of processing needs. Especially since the device is preferably a wireless device with a portable power source, less processing means that the battery or other power supplying means last for a longer time.

In an embodiment, when there are two magnets with their respective poles positioned anti-parallel to each other, the first sensing direction is substantially parallel to a top side of the device, the top side being opposite a base of the device and configured to be positioned at least partially below the wheel when the device is placed on or near the rail track, wherein the first sensing direction is further substantially parallel to a mounting side of the device, the mounting side being configured for placing the device on the lateral side of the rail.

In an embodiment, when there are two magnets with their respective poles positioned parallel to each other, the second sensing direction is substantially parallel to a top side of the device, the top side being opposite a base of the device and configured to be positioned at least partially below the wheel when the device is placed on or near the rail track, wherein the second sensing direction is further substantially parallel to a mounting side of the device, the mounting side being configured for placing the device on the lateral side of the rail.

In another embodiment, the device comprises at least one additional magnet for suppressing magnetic fields induced in the rail by rail vehicles passing the rail near the device. The additional magnet(s) apply a magnetic field to the rail, due to which the device can more accurately measure the effect of the wheel onto the magnetic field measured by the magnetic field sensor. Without this magnetic field of the additional magnets applied to the rail, when a train or other typically heavy rail vehicle passes by, a magnetic field is induced by the force introduced onto the rail. This effect is known as the Villari effect or the inverse magnetostrictive effect. This effect can be described as the change of the magnetic susceptibility of a material when subjected to a mechanical stress. More generally, with the at least one additional magnet, the effect of the force exerted by the vehicle is at least reduced or even eliminated, since most, if not all, of the magnetic domains in the rail will substantially align with the magnetic field induced by the additional magnets.

Preferably, the device comprises a top side opposite a base of the device and configured to be positioned at least partially below the wheel when the device is placed on or near the rail track, a mounting side being configured for placing the device on the lateral side of the rail, at least one mounting magnet for mounting the device onto the rail track, the at least one mounting magnet being positioned with a pole direction substantially perpendicular to the mounting side.

The mounting magnets provide a practical means for attaching and detaching the device to the rail, without the needs for nuts and bolts, corresponding holes in the rail and/or specialized clamps.

Another aspect of the present disclosure is thus a device with at least one magnet and any type of magnetic field sensor for at least detecting a wheel passing the device, wherein one or more magnets (preferably permanent) are positioned in or nearby the device onto or close to the rail to reduce or even eliminate the applicable magnetomechanical effects. These magnets may be mounting magnets, but this is not essential for obtaining the improved measurements of at least the detection of the wheel, or any other parameter such as the velocity, direction of motion, etc.

In an embodiment of any of the above aspects/embodiments, the mounting magnet is a permanent magnet having a remanence of at least 5000 gauss, preferably at least 8000 gauss, more preferred at least 12000 gauss.

In an embodiment of any of the above aspects/embodiments, the device comprises a single magnetic field sensor. Especially in combination with two, preferably permanent, magnets as described above, the use of the single magnetic field sensor is beneficial as it reduces the number of electronic components and power consumption of the device, elongating the battery life time.

In an embodiment of any of the above aspects/embodiments, the device comprises a network interface for transmitting the obtained direction of motion of the wheel, wherein preferably the network interface is a wireless network interface. The use of a wireless interface is especially beneficial since at many parts of a rail network it is often too costly to provide a network of power and communication lines. It is preferred that the wireless interface is configured to use a low power, long range network such as the LoRa network or a GSM network. A further benefit of the device is that no raw data has to be sent over the network; the device performs the analysis of the data internally with the processor. This allows for a limited amount of data to be transmitted, which also increases battery life time.

In an embodiment, the device further comprises a sensor for detecting motion, such as an acceleration sensor, wherein the at least one processor is configured to obtain a motion value indicative for a motion of the device; and to only enable the magnetic field sensor to sense magnetic field values when the motion value exceeds a predefined threshold indicating that a vehicle comprising a wheel for the rail track is approaching in order to thereafter perform the steps of obtaining and analysing. In particular, the motion detected can be a vibration of the device/rail. The motion detecting sensor and the magnetic field sensor may be provided in an integrated way. When the acceleration sensor is used to first obtain an indication for an approaching vehicle/wheel, power is saved since the magnetic field sensors typically require more power than motion detecting sensors such as acceleration sensors. In general, it is possible that MEMS type sensors are used in the device.

In a further embodiment, the device comprises energy storage means for providing electric power to the device. Also, portable energy providing means such as a solar cell may be provided.

According to a further aspect, there is provided a method carried out in a device comprising at least one magnet for providing a magnetic field; a magnetic field sensor for sensing a magnetic field value indicative for a flux density, or a change in the flux density, of the provided magnetic field; and at least one processor in communication with the magnetic field sensor, the method comprising the at least one processor performing the steps of obtaining a plurality of the magnetic field values for respective times from the magnetic field sensor; and analysing the obtained plurality of magnetic field values such that a direction of motion of a wheel passing the device is obtained.

As will be apparent, the device according to the first aspect is in particular configured for applying any one or more of the method steps described above and/or below. In addition, it will be apparent that any of the advantages mentioned for the method(s) and method steps described herein apply to the device and advantages mentioned for the device apply to the corresponding method(s) and method steps.

According to a further aspect, there is provided a computer program product comprising computer-executable instructions for performing any one method according to any one of the steps of any one of the embodiments described above and/or below, when the program is run on the device according to the first aspect.

According to a further aspect, there is provided a computer program comprising computer-executable instructions to perform the method according to any one of the steps of any one of the embodiments described above and/or below, when the program is executed on the device according to the first aspect.

According to another aspect there is provided a data storage device encoding a program in machine-readable and machine-executable form to perform one or more steps of any one of the embodiments of the method described above and/or below.

BRIEF DESCRIPTION OF THE INVENTION

The accompanying drawings are used to illustrate presently preferred non-limiting exemplary embodiments of devices of the present disclosure. The above and other advantages of the features and objects of the disclosure will become more apparent and the aspects and embodiments will be better understood from the following detailed description when read in conjunction with the accompanying drawings, in which.

Figure 1:
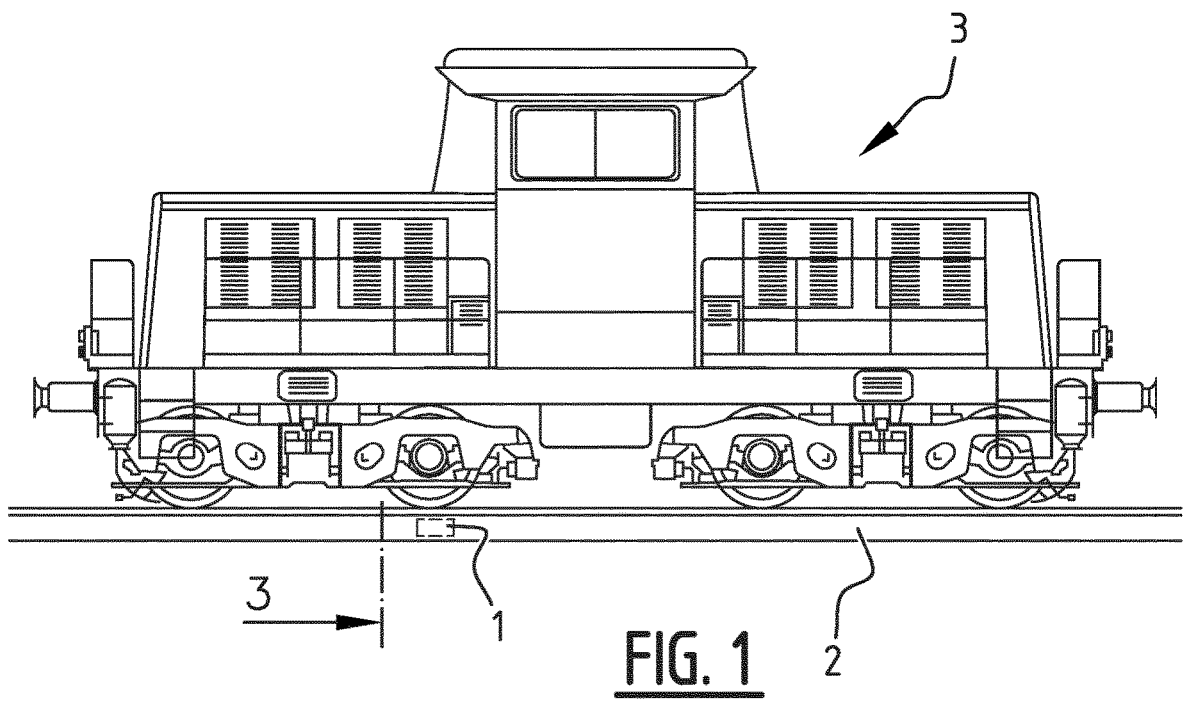
FIG. 1 is a schematic side view of an embodiment of the device according to the present disclosure positioned on a lateral side of a rail carrying a rail vehicle.
Figure 2:
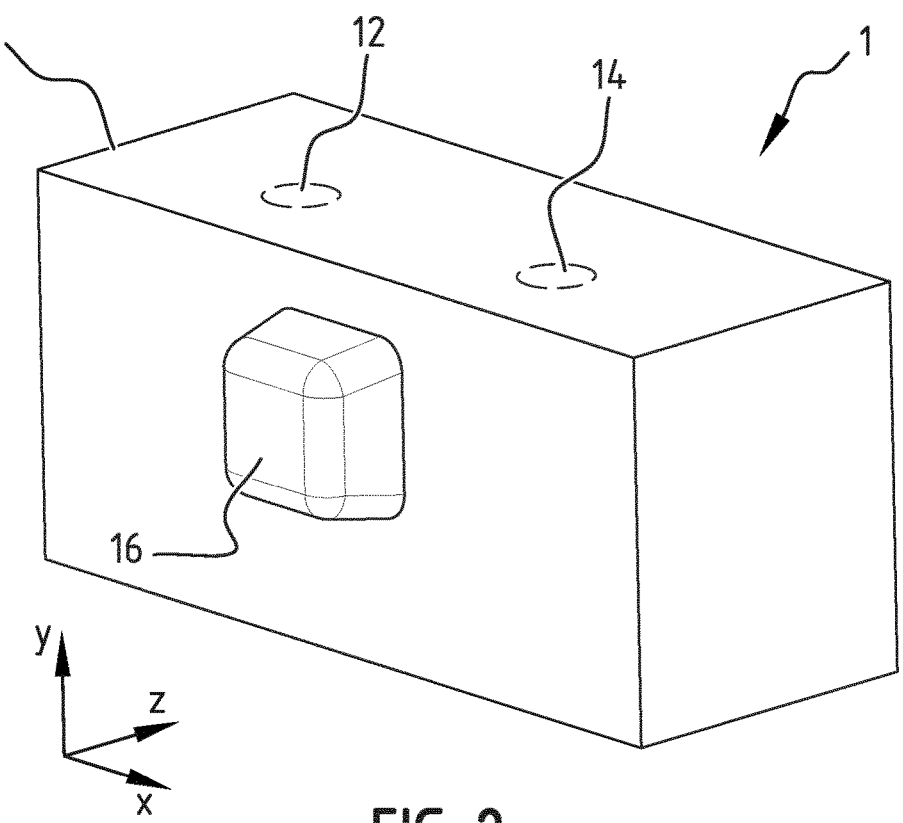
FIG. 2 is a schematic view in perspective of an embodiment of the device according to the present disclosure.
Figure 3:
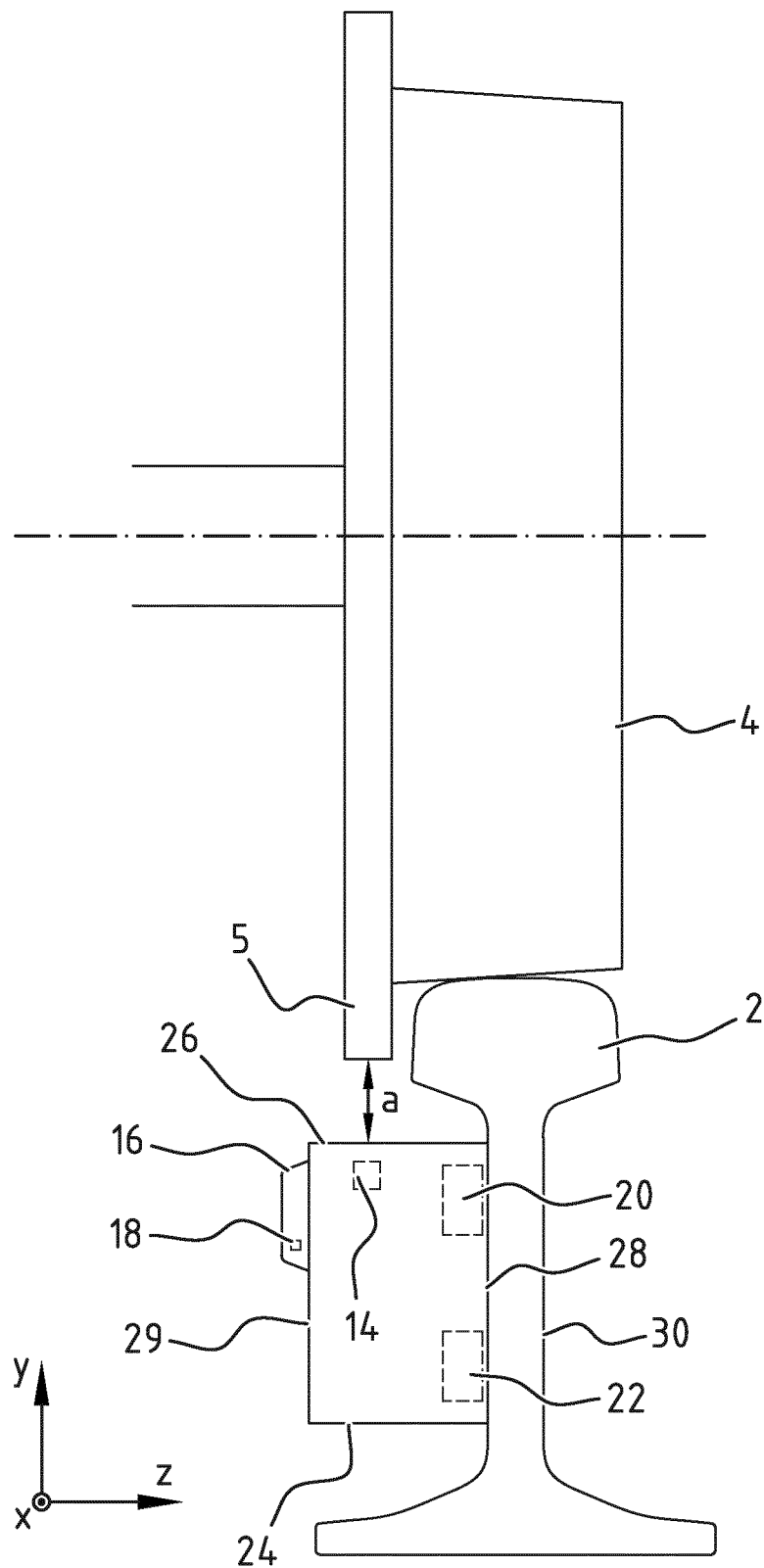
FIG. 3 is a side and partial section view in a longitudinal direction of the rail as indicated in FIG. 1.
Figure 4:
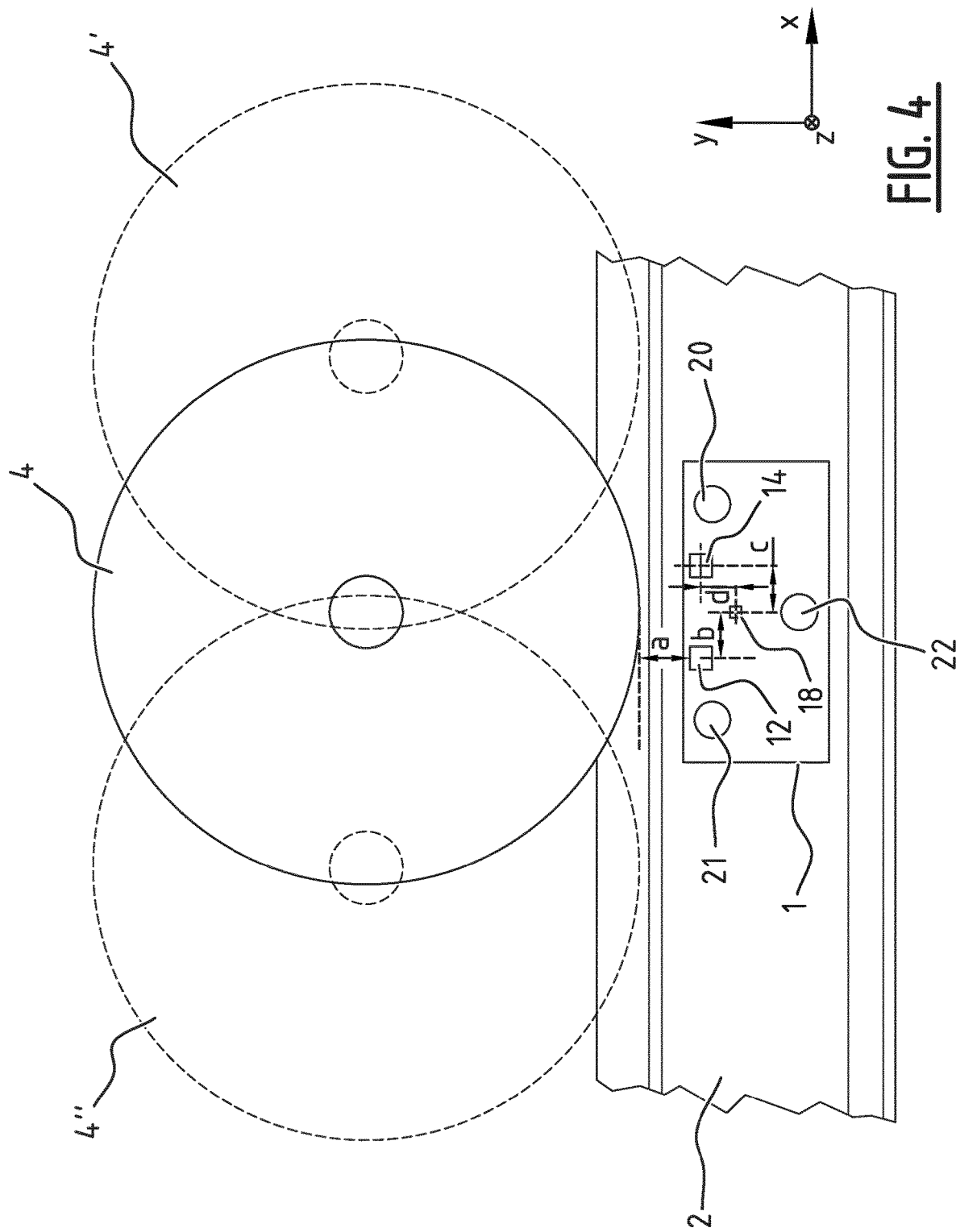
Figure 5:
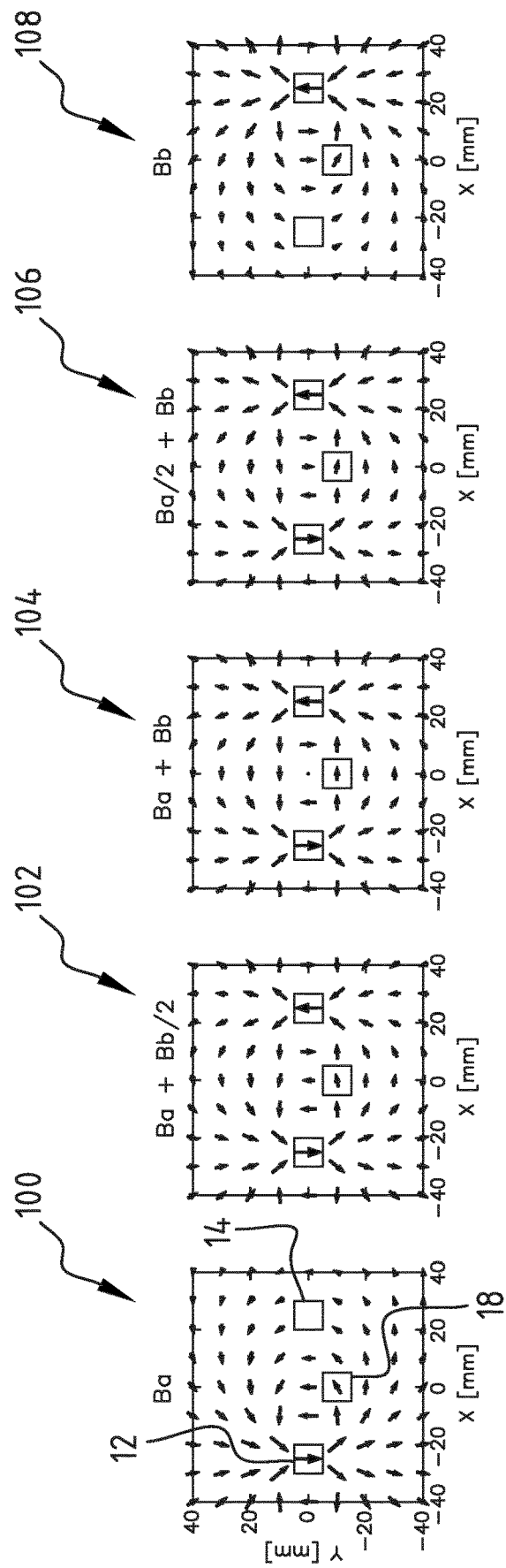
Figure 6:
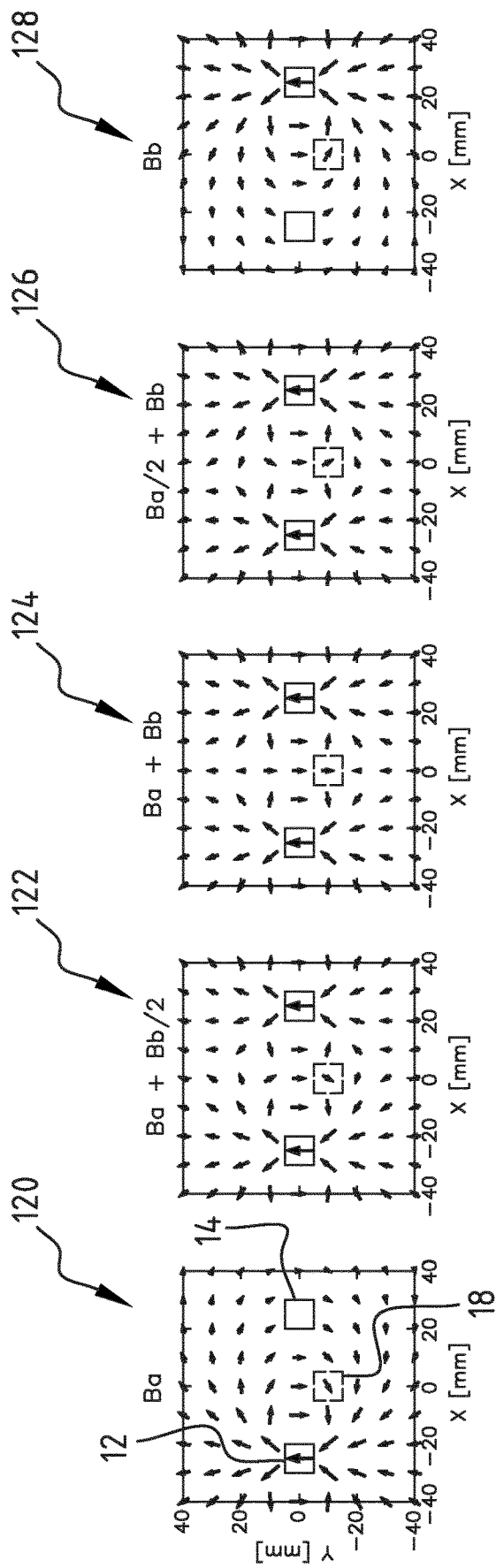
Figure 7:
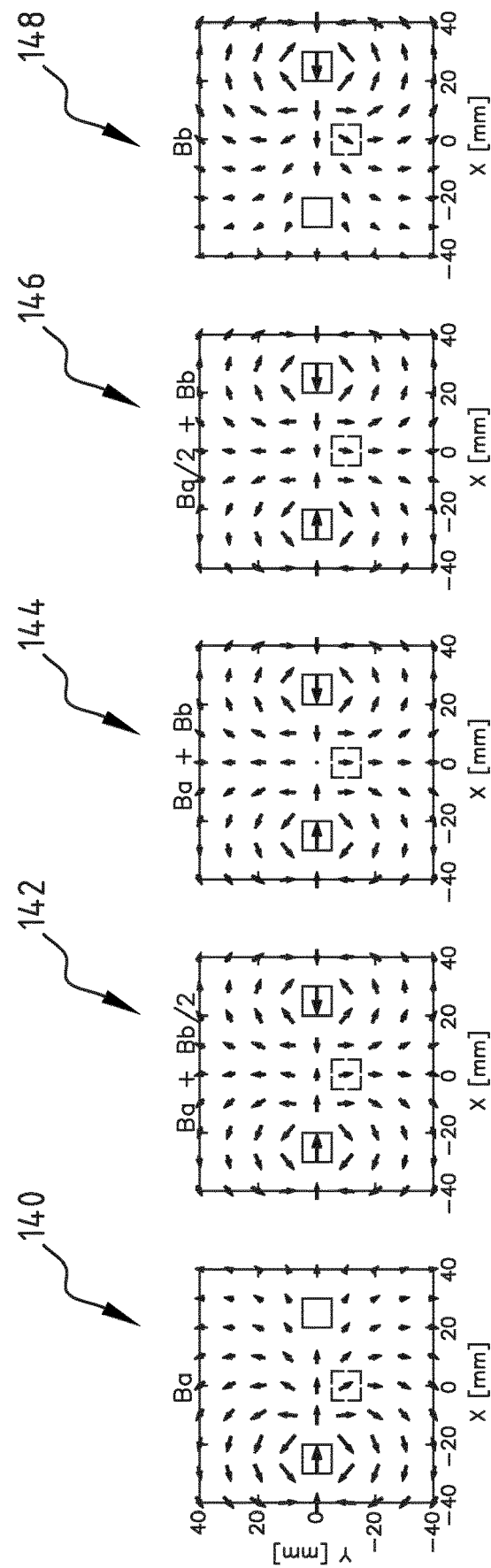
Figure 9:
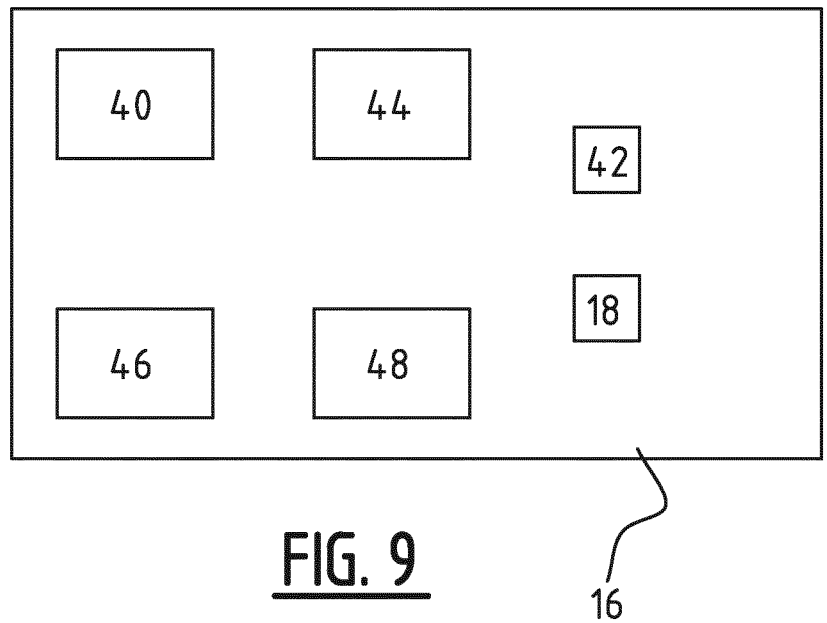
Figure 10:
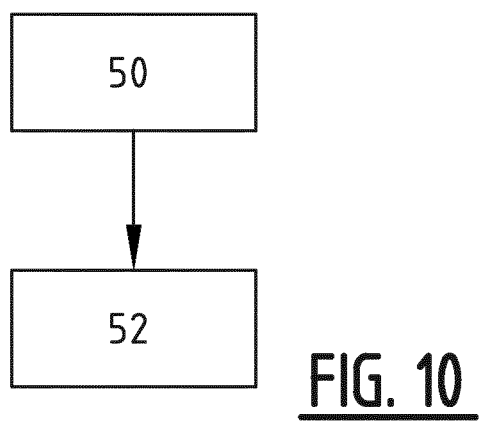

FIG. 4 a schematic view of a lateral side of the rail showing the device of FIGS. 1-3 and showing a rail vehicle wheel in several positions compared to the device;

FIG. 5 is an array of plots showing the magnetic field direction and flux density at several positions along an embodiment of the device of the present disclosure for different contributions to the magnetic field of two magnets of the device, the two magnets having anti-parallel pole directions;

FIG. 6 is an array of plots showing the magnetic field direction and flux density at several positions along an embodiment of the device of the present disclosure for different contributions to the magnetic field of two magnets of the device, the two magnets having parallel pole directions;

FIG. 7 is an array of plots showing the magnetic field direction and flux density at several positions along an embodiment of the device of the present disclosure for different contributions to the magnetic field of two magnets of the device, the two magnets having anti-parallel pole directions with respective north poles pointing towards each other;

FIG. 8A is a plot of the measured magnetic field flux density as a function of time and in three directions by the embodiment of the device of FIG. 5 for a wheel passing in a forward direction;

FIG. 8B is a plot of the measured magnetic field flux density as a function of time and in three directions by the embodiment of the device of FIG. 5 for a wheel passing in a backward direction;

FIG. 9 is a scheme of a part of the device housing electronics according to an embodiment of the present disclosure; and FIG. 10 is a flow chart of a method according to an embodiment of the present disclosure.

DESCRIPTION OF THE INVENTION

As shown in FIG. 1, a device 1 for detecting a direction of motion of a wheel on a rail track is placed on an inner lateral side of a rail 2 over which a locomotive 3 is passing. The locomotive 3 is an example of a rail vehicle. The direction of motion of the locomotive 3 (and thus its wheels) in these figures is indicated as forward when the locomotive is moving from the right towards the left, and backward when the locomotive 3 is moving towards the right.

The device 1 is thus configured to be placed on or near a lateral side of the rail track 2. The device 1 comprises in this embodiment a first magnet 12 and a second magnet 14 (see FIG. 2). These magnets 12 and 14 are for providing a magnetic field. The device 1 further comprises a magnetic field sensor 18 (see FIG. 3) for sensing a magnetic field value indicative for a flux density, or a change in the flux density, of the provided magnetic field. The sensor 18 is placed in house 16, which contains the electronic parts of the device 1, preferably in a waterproof manner The device 1 further comprises at least one processor 40 in communication with the magnetic field sensor 18 (see FIG. 9). In addition, the device 1 may comprise a battery 44, which is an example of power storage means, an acceleration sensor 42, which is an example of a motion sensor, and a wireless interface 48. Although the device 1 could alternatively or additionally comprise a wired interface, a wireless interface is preferred due to the ease of implementation. The wireless interface 48 preferably connects via a LoRa network or a GSM network. The device 1 in addition comprises a storage unit 46, configured to store instructions for the processor 40 to execute. These instructions may take the form of firmware.

In the device 1, the first magnet 12 and second magnet 14 are distanced from each other by a first distance b+c (see FIG. 4), wherein the magnetic field sensor 18 is positioned such that it is capable of sensing the magnetic field originating of both the first 12 and the second 14 magnet.

As shown in FIGS. 3 and 4, the device 1 comprises a base 24 and a top side 26 opposite the base 24. The device 1 further comprises a mounting side 28 for mounting the device onto a lateral side of the rail 2. In FIG. 3, the device is mounted at a lateral side of rail 2 opposite lateral side 30. Opposite the mounting side 28, the device 1 comprises a second lateral side 29. At this lateral side 29, the house 16 is mounted. The first 12 and second 14 magnets are oriented substantially parallel to the top side 26, wherein magnetic pole directions of the first 12 and second 14 magnets are substantially perpendicular to the top side 26. As will be clear, and as also explained below, the orientation of the first 12 and second 14 magnets can also be different.

The first distance b+c is in the range of 20 to 200 mm, wherein the magnetic field sensor 18 is preferably positioned at substantially equal respective distances b and c (in the x-direction) from the first and second magnets. In the shown embodiment, the sensor 18 is, however, not directly in the middle between the two magnets 12, 14, but positioned at a distance d in the y-direction below the magnets 12, 14. This is done in particular when at that position, a component or vector of the magnetic field in one measurement direction is the same for both magnets, as is explained in further detail below.

The processor 40 obtains a plurality of the magnetic field values for respective times from the magnetic field sensor 18. Thereafter, the obtained plurality of magnetic field values is analysed such that a direction of motion of a wheel 4, or a rim or flange 5 thereof, passing the device 1 is obtained.

An example dataset is shown in FIG. 8A. Referring to the uppermost data "By" in FIG. 8A, there is a baseline 71 indicated with a dashed line. The analysis of the obtained plurality of magnetic field values such that a direction of motion of the wheel 4 passing the device 1 is obtained can be done by comparing the plurality of magnetic field values with the base line 71 magnetic field value sensed by the magnetic field sensor 18 when no wheel 4 (or other object) is present to detect a relative increase 70 and subsequent decrease 72 (FIG. 8A), or a relative decrease 80 and subsequent increase 82 (FIG. 8B) of the plurality of magnetic field values compared to the base line 71 (or baseline 81) magnetic field value.

Additionally or alternative, the comparing may be done by detecting whether at a first point in time 78 one of the plurality of magnetic field values is larger than the base line 71, 81 magnetic field value and at a second point in time 79 after the first point in time another one of the plurality of magnetic field values is smaller than the base line 71 magnetic field value in order to determine that the wheel 4 passing the device 1 is moving forward (FIG. 8A), so to the left in FIG. 1.

To determine that the wheel 4 is moving in the other, backward, direction, then it is detected that at a first point in time 88 one of the plurality of magnetic field values is smaller than the base line 81 magnetic field value and at a second point in time 89 after the first point in time 88 another one of the plurality of magnetic field values is larger than the base line magnetic field value 81 in order to determine that the wheel 4 passing the device 1 is moving in the backwards direction (FIG. 8B), so to the right in FIG. 1

Alternatively or additionally, the comparing comprises detecting whether a first difference between a first value of the plurality of magnetic field values and the base line magnetic field value is larger than a first threshold value above the base line magnetic field value or lower than a second threshold value below the base line magnetic field value. When the first difference is larger than the first threshold value, it is detected whether a second difference between a second value of the plurality of magnetic field values and the base line magnetic field value is lower than a third threshold value, the second value corresponding to a later point in time than the first value, in order to determine that the wheel 4 passing the device 1 has a first direction of motion (forward). When the first difference is smaller than the second threshold value, it is detected whether a second difference between a second value of the plurality of magnetic field values and the base line magnetic field value is larger than a fourth threshold value, the second value corresponding to a later point in time than the first value in order to determine that the wheel 4 passing the device 1 has a second direction of motion (backwards).

The device 1 may be configured to detect whether at least one of the obtained plurality of magnetic field values meets a condition indicating the presence of a wheel 4 on the rail track 2, wherein the processor 40 is configured to only obtain a direction of the wheel 4 when the obtained magnetic field value meets the condition indicating the presence of a wheel on the rail track. The condition indicating the presence of a wheel on the rail track 2 may be a condition of exceeding a predetermined fifth threshold value of an absolute value of a difference between at least one value of the plurality of magnetic field values and a base line magnetic field value sensed by the magnetic field sensor when no wheel is present. When the device 1 has a sensor 18 that is capable to sense in two perpendicular directions, such as the x and y directions shown in FIGS. 2-4, it is possible to check the condition in one of the two directions. For instance, in FIG. 8A, the "Bx" signal corresponds to the magnetic field flux in the x-direction, while the "By" signal corresponds to the magnetic field flux in the y-direction. The "Bx" signal can be used for the purpose of finding out whether the condition is met, since it shows a large dip in the signal when the wheel is passing.

As in the embodiment shown in FIG. 4, it is preferred that the magnetic field sensor 18 is positioned at a position where a first magnetic field direction of a magnetic field component of the first magnet is different from a second magnetic field direction of a magnetic field component of the second magnet. This can be seen in FIGS. 5-7. In FIG. 5, concerning an embodiment where the magnets 12, 14 have their magnetic fields aligned in an anti-parallel fashion, the sensor 18 is positioned not exactly between the two magnets, since the magnetic field component of the first magnet and the second magnet have the same x-component of B there, namely zero. It would, however, still be possible to measure the increase/decrease or decrease/increase in the y-component, equivalent to the data shown in FIGS. 8A and 8B.

In FIG. 6, concerning an embodiment where the magnets 12, 14 have their magnetic field aligned in a parallel fashion, the position in the middle between the magnets have the same component in both the x-direction (zero) and the y-direction (field pointing down as shown by the arrow). Therefore, the sensor 18 is positioned somewhat below that middle position. There, the component in the x-direction of the magnet 12 is towards the left in the plot 120, wherein the contribution of magnet 14 is ignored. In plot 128, where the contribution of magnet 12 is ignored, the component in the x-direction of the magnet 14 is towards the right. When the contribution of both the magnets is taken into account (plot 124), the net field in the x-direction is zero.

It is alternatively possible to rotate one of the two magnets such that the middle position can still be used by the sensor 18.

In FIGS. 5-7, "Ba" indicates the maximum field generated by the magnet 12 and "Bb" indicates the maximum field generated by the magnet 14. The respective plots 104, 124 and 144 show a situation wherein no wheel 4 or other object is present, and the sensor 18 measures the magnetic field generated by both magnets 12, 14. When a wheel approaches from the right (e.g. the position 4' in FIG. 4), it blocks part of the magnetic field generated by magnet 14. As an example, plots 102, 122 and 124 show a situation wherein the magnet 14 generates half the magnetic field as it can produce in the situation in plots 104, 124 and 144.

Referring to plot 102, it can be seen that the magnetic field component in the y-direction at the position of the sensor 18 is increased. When the magnetic field of magnet 14 is fully blocked, as shown in plot 100, the magnetic field component in the y-direction at the position of the sensor 18 has increased even more. This corresponds to the situation of FIG. 8A, wherein the increase 70 can be seen in the By signal.

When the wheel 4 moves further to the left (forward) again the situation of plot 102 is encountered and the By signal decreases again, corresponding to the situation shown in plot 104, albeit only for the y-direction. When the wheel 4 moves further left, the magnetic field generated by the magnet 12 is partially blocked, and the situation similar to that of plot 106 is encountered where the y-component of the magnetic field measured by the sensor is starting to point downwards, resulting in a decrease of the signal as shown in FIG. 8A by the start of the decrease 72. The minimum in the decrease 72 will be obtained when the magnet 12 has no contribution whatsoever, as shown in plot 108. In practice, this situation is likely not achieved, however. FIGS. 5-7 are used to show the working principle of the device 1. When the wheel moves further towards the left, again a situation similar to plot 106 will occur since the wheel 4 will partially block the field of the magnet 12 (e.g. position 4" shown in FIG. 4). The y-component is still directed downward, but now slightly less again. Once the wheel 4 is sufficiently far away, again both magnets 12 and 14 will contribute as in plot 104.

A similar reasoning holds for the backward moving wheel approaching from the left (e.g. from position 4" in FIG. 4), a signal of which is shown in FIG. 8B, and it will be understood that the signal in the y-direction then first decreases, and thereafter increases. This difference is used in the device 1 to determine the direction of motion as described above.

FIG. 6 shows resulting field directions and magnitudes of a device wherein the geometry of the magnetic axes of the magnets 12 and 14 is parallel. Plots 120-128 are equivalent to plots 100-108. In this case, the magnetic field in the x-direction would show a signal similar to the "By" signal in FIGS. 8A and B. The magnetic field in the y-direction would show a signal similar to the "Bx" signal in FIGS. 8A and 8B.

FIG. 7 shows another example of the magnets 12 and 14 being oriented with their magnetic axes pointing towards each other, showing that many orientations are possible. Plots 140-148 are equivalent to plots 100-108 and 120-128. Here also the magnetic field of the x-direction would show a signal similar to the "By" signal in FIGS. 8A and 8B.

Although symmetric positions are shown in FIGS. 5-7, other non symmetric orientations of the magnetic axes of the magnets 12 and 14 are still possible.

It is preferred that the magnets 12 and 14 are permanent magnets. One suitable magnet is a NbFeB magnet produced by Webcraft GmbH, having a magnetisation grade of N45, which in this case means a remanence ($B_r$) of 13200-13700 gauss. This magnet has the shape of a cylinder having a diameter of 10 mm and a height of 10 mm The pole axis is directing along the longitudinal direction of the cylinder.

The device 1 is configured such that the at least one magnet 12, 14 provides a magnetic field is at least partially influenced by the wheel 4 when the wheel is passing the device at a distance a (see FIGS. 3 and 4) of at most 10 cm. It is preferred that the device is made such that it is placed at a distance in the range of 1.5 to 5 cm from the flange 5 of the wheel 4. The magnetic field sensor 18 is positioned such that it senses the change in magnetic field caused by the wheel as described above.

The magnetic field sensor 18 in the shown embodiments is a two dimensional magnetic field sensor that senses two components of the magnetic field in first and second perpendicular sensing directions, such as the x-direction and the y-direction shown in FIGS. 2-4.

It is preferred that respective first and second pluralities of the magnetic field values are obtained for respective times from the magnetic field sensor 18 for each respective first and second sensing direction. Thereafter, the obtained first plurality of magnetic field values are analysed by detecting whether the magnetic field values drop below a threshold value indicating the presence of a wheel on the rail track passing the device. For example, the first plurality of magnetic field values is the "Bx" signal in FIGS. 8A and 8B.

When presence of a wheel is detected, the second plurality of magnetic field values is analysed to determine the direction of motion of the wheel.

This analysis of the second plurality of magnetic field values to determine the direction of motion of the wheel may be done by estimating a peak position 76, 86 in the first plurality of magnetic field values (Bx), the peak position 76, 86 indicating a moment in time when the wheel 4 is substantially above the device 1. Thereafter, a sign of a first derivative of the second plurality of magnetic field values (By) near the estimated peak position 76, 86 is determined. When the determined sign of the first derivative is positive (situation of FIG. 8B as seen in signal By between the decrease 80 and the increase 82), the direction of motion of the wheel to be in a backward direction along the rail track is determined. When the determined sign of the first derivative is negative (situation of FIG. 8A as seen in signal By between the increase 70 and the decrease 72), the direction of motion of the wheel is determined to be in the backward direction along the rail track 2.

Although this is a resource efficient and practical way of determining the direction of motion, it will be apparent to the skilled person that various other ways of determining the increase/decrease or decrease/increase of the measured signal.

The device 1 may further comprise additional magnets 20-22 for suppressing magnetic fields induced in the rail 2 by rail vehicles 3 passing the rail 2 near the device 1. The magnets 20-22 are positioned near the mounting side 28 to achieve the largest beneficial effect w.r.t. the magnetomechanical effects as described above.

The additional magnets 20-22 can also function a mounting magnet for mounting the device onto the rail 2. Preferably, the additional magnets 20-22 are with a pole direction substantially perpendicular to the mounting side 28.

It is preferred that the magnets 20-22 are permanent magnets. One suitable magnet is a NbFeB magnet produced by Webcraft GmbH, having a magnetisation grade of N42, which in this case means a remanence ($B_r$) of 12900-13200 gauss. This magnet has the shape of a cylinder having a diameter of 20 mm and a height of 10 mm The pole axis is directing along the longitudinal direction of the cylinder.

The described device 1 beneficially only requires a single magnetic field sensor 18 in order to accurately detect the wheel 4 and optionally also obtain the wheel's 4 direction of motion as described with respect to preferred embodiments. It will be understood that also the speed of the vehicle 3 can be obtained, based on the signals of e.g. FIGS. 8A and 8B. When the increase and decrease occur over a shorter time span, the vehicle 3 is moving faster than when the increase and decrease occur over a longer time span. A calibration of the device 1 then allows to determine a speed of the vehicle 3.

The device 1 may comprise a sensor for detecting motion, such as an acceleration sensor 42. Then a motion value indicative for a motion of the device can be obtained and the magnetic field sensor to sense magnetic field values is only enabled when the motion value exceeds a predefined threshold indicating that a vehicle comprising a wheel for the rail track is approaching in order to thereafter perform the steps of obtaining and analysing. For example, the motion value can be a variance of a plurality of datapoints obtained from the motion sensor (e.g. the acceleration sensor), and a variance of the data points can be determined to obtain an indication of the vibration level. Then it can be determined whether the variance exceeds a predefined variance indicative for a threshold vibration level.

As shown in FIG. 10, a method of detecting a wheel on a rail track comprises obtaining 50 a plurality of the magnetic field values for respective times from the magnetic field sensor; and analysing 52 the obtained plurality of magnetic field values such that a direction of motion of a wheel passing the device is obtained. Other steps are described in the above description in relation to the device 1, or are readily derivable therefrom.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGS., including any functional blocks labelled as "units", "processors" or "modules", may be provided through the use of dedicated hardware as well as hardware capable of executing software such as firmware in association with appropriate software. When provided by a processor, the functions may be provided by a single dedicated processor, by a single shared processor, or by a plurality of individual processors, some of which may be shared. Moreover, explicit use of the term "unit", "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The disclosure further comprises the following embodiments.

1. Device for detecting a direction of motion of a wheel on a rail track, the device being configured to be placed on or near a lateral side of the rail track, the device comprising:
    at least one magnet for providing a magnetic field;
    a magnetic field sensor for sensing a magnetic field value indicative for a flux density, or a change in the flux density, of the provided magnetic field;
    at least one processor in communication with the magnetic field sensor, wherein the at least one processor is configured to:
        obtain a plurality of the magnetic field values for respective times from the magnetic field sensor; and to
        analyse the obtained plurality of magnetic field values such that a direction of motion of a wheel passing the device is obtained.

2. Device according to embodiment 1, wherein the processor is configured to analyse the obtained plurality of magnetic field values such that a direction of motion of a wheel passing the device is obtained by comparing the plurality of magnetic field values with a base line magnetic field value sensed by the magnetic field sensor when no wheel is present to detect a relative increase and subsequent decrease, or a relative decrease and subsequent increase of the plurality of magnetic field values compared to the base line magnetic field value.

3. Device according to embodiment 2, wherein the comparing comprises
    detecting whether at a first point in time one of the plurality of magnetic field values is larger than the base line magnetic field value and at a second point in time after the first point in time another one of the plurality of magnetic field values is smaller than the base line magnetic field value in order to determine that the wheel passing the device has a first direction of motion; and
    detecting whether at a first point in time one of the plurality of magnetic field values is smaller than the base line magnetic field value and at a second point in time after the first point in time another one of the plurality of magnetic field values is larger than the base line magnetic field value in order to determine that the wheel passing the device has a second direction of motion different from the first direction of motion.

4. Device according to embodiment 2 or 3, wherein the comparing comprises
    detecting whether a first difference between a first value of the plurality of magnetic field values and the base line magnetic field value is larger than a first threshold value above the base line magnetic field value or lower than a second threshold value below the base line magnetic field value;
        when the first difference is larger than the first threshold value, detecting whether a second difference between a second value of the plurality of magnetic field values and the base line magnetic field value is lower than a third threshold value, the second value corresponding to a later point in time than the first value, in order to determine that the wheel passing the device has a first direction of motion; and
        when the first difference is smaller than the second threshold value, detecting whether a second difference between a second value of the plurality of magnetic field values and the base line magnetic field value is larger than a fourth threshold value, the second value corresponding to a later point in time than the first value in order to determine that the wheel passing the device has a second direction of motion different from the first direction of motion.

5. Device according to any one of the preceding embodiments, the at least one processor being further configured to detect whether at least one of the obtained plurality of magnetic field values meets a condition indicating the presence of a wheel on the rail track, wherein the at least one processor is configured to only obtain a direction of the wheel when the obtained magnetic field value meets the condition indicating the presence of a wheel on the rail track.

6. Device according to embodiment 5, wherein the condition indicating the presence of a wheel on the rail track is a condition of exceeding a predetermined fifth threshold value of an absolute value of a difference between at least one value of the plurality of magnetic field values and a base line magnetic field value sensed by the magnetic field sensor when no wheel is present.

7. Device according to any one of the preceding embodiments, wherein the magnetic field sensor is positioned such that it is outside a point of symmetry of the at least one magnet and a longitudinal direction of the rail track when the device is placed on or near the lateral side of the rail track, wherein preferably, when the at least one magnet is positioned such that its magnetic pole axis is perpendicular to a longitudinal direction of the rail track when the device is placed on or near the rail track, the magnetic field sensor is placed adjacent to the magnetic pole axis.
8. Device according to any one of the preceding embodiments, the device comprising a first and a second magnet for providing the magnetic field, wherein the first and second magnets are distanced from each other by a first distance, wherein the magnetic field sensor is positioned such that it is capable of sensing the magnetic field originating of both the first and the second magnet.
9. Device according to embodiment 8, wherein the magnetic field sensor is positioned at a position where a first magnetic field direction of a magnetic field component of the first magnet is different from a second magnetic field direction of a magnetic field component of the second magnet.
10. Device according to embodiment 8 or 9, wherein the first and second magnets are positioned such that magnetic pole directions of the first and second magnets are substantially anti-parallel.
11. Device according to embodiment 8 or 9, wherein the first and second magnets are positioned such that magnetic pole directions of the first and second magnets are substantially parallel.
12. Device according to any one of embodiments 8-11, wherein the device comprises a base and a top side opposite the base, wherein the first and second magnets are positioned substantially parallel to the top side, wherein magnetic pole directions of the first and second magnets are substantially perpendicular to the top side.
13. Device according to any one of embodiments 8-12, wherein the first distance is in the range of 20 to 200 mm, wherein the magnetic field sensor is preferably positioned at substantially equal respective distances from the first and second magnets.
14. Device according to any one of the preceding embodiments, wherein the at least one magnet is a permanent magnet.
15. Device according to embodiment 14, wherein the at least one magnets has a remanence of at least 5000 gauss, preferably at least 8000 gauss, more preferred at least 12000 gauss.
16. Device according to any one of the preceding embodiments, wherein the at least one magnet is configured such that the provided magnetic field is at least partially influenced by the wheel when the wheel is passing the device at a distance of at most 10 cm, wherein the magnetic field sensor is positioned such that it senses the change in magnetic field caused by the wheel.
17. Device according to embodiment 16, wherein the magnetic field sensor is distanced from the at least one magnet by a second distance that has a similar or same order of magnitude as a third distance between the at least one magnet and a nearest position of the wheel when the wheel passes the device when positioned on or near the rail track.
18. Device according to any one of the preceding embodiments, wherein the magnetic field sensor is a two dimensional magnetic field sensor that senses two components of the magnetic field in first and second perpendicular sensing directions, wherein the processor is configured to
obtain respective first and second pluralities of the magnetic field values for respective times from the magnetic field sensor for each respective first and second sensing direction;
analyse the obtained first plurality of magnetic field values by detecting whether the magnetic field values drop below a threshold value indicating the presence of a wheel on the rail track passing the device;
when the presence of a wheel is detected, analysing the second plurality of magnetic field values to determine the direction of motion of the wheel.
19. Device according to embodiment 18, in dependence of embodiment 8, wherein the at least one processor is configured to
analyse the second plurality of magnetic field values to determine the direction of motion of the wheel by estimating a peak position in the first plurality of magnetic field values, the peak position indicating a moment in time when the wheel is substantially above the device;
determine a sign of a first derivative of the second plurality of magnetic field values near the estimated peak position;
when the determined sign of the first derivative is positive, determine the direction of motion of the wheel to be in a first direction along the rail track; and
when the determined sign of the first derivative is negative, determine the direction of motion of the wheel to be in a second direction along the rail track.
20. Device according to embodiment 18 or 19, in dependence of embodiment 10, wherein the first sensing direction is substantially parallel to a top side of the device, the top side being opposite a base of the device and configured to be positioned at least partially below the wheel when the device is placed on or near the rail track, wherein the first sensing direction is further substantially parallel to a mounting side of the device, the mounting side being configured for placing the device on the lateral side of the rail.
21. Device according to embodiment 11 or 12, in dependence of embodiment 11, wherein the second sensing direction is substantially parallel to a top side of the device, the top side being opposite a base of the device and configured to be positioned at least partially below the wheel when the device is placed on or near the rail track, wherein the second sensing direction is further substantially parallel to a mounting side of the device, the mounting side being configured for placing the device on the lateral side of the rail.
22. Device according to any one of the preceding embodiments, further comprising at least one additional magnet for suppressing magnetic fields induced in the rail by rail vehicles passing the rail near device.
23. Device according to any one of the preceding embodiments, comprising a top side opposite a base of the device and configured to be positioned at least partially below the wheel when the device is placed on the rail track, a mounting side configured for placing the device on the lateral side of the rail, wherein the at least one additional magnet functions as at least one mounting magnet for mounting the device onto the rail track, the at least one mounting magnet being positioned with a pole direction substantially perpendicular to the mounting side.
24. Device according to embodiment 22 or 23, wherein the at least one additional magnet is a permanent magnet having a remanence of at least 5000 gauss, preferably at least 8000 gauss, more preferred at least 12000 gauss.

25. Device according to any one of the preceding embodiments, wherein the device comprises a single magnetic field sensor.
26. Device according to any one of the preceding embodiments, further comprising a network interface for transmitting the obtained direction of motion of the wheel, wherein preferably the network interface is a wireless network interface.
27. Device according to any one of the preceding embodiments, further comprising a sensor for detecting motion, such as an acceleration sensor, wherein the at least one processor is configured to
obtain a motion value indicative for a motion of the device; and to
only enable the magnetic field sensor to sense magnetic field values when the motion value exceeds a predefined threshold indicating that a vehicle comprising a wheel for the rail track is approaching in order to thereafter perform the steps of obtaining and analysing.
28. Device according to any one of the preceding embodiments, further comprising energy storage means for providing electric power to the device.
29. Method of detecting a wheel on a rail track, the method being carried out in a device comprising at least one magnet for providing a magnetic field; a magnetic field sensor for sensing a magnetic field value indicative for a flux density, or a change in the flux density, of the provided magnetic field; and at least one processor in communication with the magnetic field sensor, the method comprising the at least one processor performing the steps of:
obtaining a plurality of the magnetic field values for respective times from the magnetic field sensor; and
analysing the obtained plurality of magnetic field values such that a direction of motion of a wheel passing the device is obtained.
30. Method according to embodiment 29, wherein a device according to any one of embodiments 1-28 is used.
31. Computer program product comprising computer-executable instructions for performing the method of embodiment 29 or 30, when the program is run on the device according any one of embodiments 1-28.

Whilst the principles of the described methods and devices have been set out above in connection with specific embodiments, it is to be understood that this description is merely made by way of example and not as a limitation of the scope of protection which is determined by the appended claims.

The invention claimed is:

1. A device for detecting a direction of motion of a wheel on a rail track, the device being configured to be placed on or near a lateral side of the rail track, the device comprising:
at least one permanent magnet for providing a magnetic field;
a magnetic field sensor for sensing a magnetic field value indicative for a flux density, or a change in the flux density, of the provided magnetic field;
at least one processor in communication with the magnetic field sensor, wherein the at least one processor is configured to:
obtain a plurality of the magnetic field values for respective times from the magnetic field sensor; and to
analyse the obtained plurality of magnetic field values such that a direction of motion along the rail track of a wheel passing the device is obtained.

2. The device according to claim 1, wherein the processor is configured to analyse the obtained plurality of magnetic field values such that a direction of motion along the rail track of a wheel passing the device is obtained by comparing the plurality of magnetic field values with a base line magnetic field value sensed by the magnetic field sensor when no wheel is present to detect a relative increase and subsequent decrease, or a relative decrease and subsequent increase of the plurality of magnetic field values compared to the base line magnetic field value.

3. The device according to claim 2, wherein the comparing comprises
detecting whether at a first point in time one of the plurality of magnetic field values is larger than the base line magnetic field value and at a second point in time after the first point in time another one of the plurality of magnetic field values is smaller than the base line magnetic field value in order to determine that the wheel passing the device has a first direction of motion along the rail track; and
detecting whether at a first point in time one of the plurality of magnetic field values is smaller than the base line magnetic field value and at a second point in time after the first point in time another one of the plurality of magnetic field values is larger than the base line magnetic field value in order to determine that the wheel passing the device has a second direction of motion along the rail track different from the first direction of motion along the rail track.

4. The device according to claim 2, wherein the comparing comprises
detecting whether a first difference between a first value of the plurality of magnetic field values and the base line magnetic field value is larger than a first threshold value above the base line magnetic field value or lower than a second threshold value below the base line magnetic field value;
when the first difference is larger than the first threshold value, detecting whether a second difference between a second value of the plurality of magnetic field values and the base line magnetic field value is lower than a third threshold value, the second value corresponding to a later point in time than the first value, in order to determine that the wheel passing the device has a first direction of motion along the rail track; and
when the first difference is smaller than the second threshold value, detecting whether a second difference between a second value of the plurality of magnetic field values and the base line magnetic field value is larger than a fourth threshold value, the second value corresponding to a later point in time than the first value in order to determine that the wheel passing the device has a second direction of motion along the rail track different from the first direction of motion along the rail track.

5. The device according to claim 1, wherein the at least one processor is further configured to detect whether at least one of the obtained plurality of magnetic field values meets a condition indicating the presence of a wheel on the rail track, and wherein the at least one processor is configured to only obtain a direction of the wheel when the obtained magnetic field value meets the condition indicating the presence of a wheel on the rail track.

6. The device according to claim 5, wherein the condition indicating the presence of a wheel on the rail track is a condition of exceeding a predetermined fifth threshold value of an absolute value of a difference between at least one value of the plurality of magnetic field values and a base line magnetic field value sensed by the magnetic field sensor when no wheel is present.

7. The device according to claim 1, wherein the magnetic field sensor is positioned such that it is outside a point of symmetry of the at least one magnet and a longitudinal direction of the rail track when the device is placed on or near the lateral side of the rail track, wherein preferably, when the at least one magnet is positioned such that its magnetic pole axis is perpendicular to a longitudinal direction of the rail track when the device is placed on or near the rail track, the magnetic field sensor is placed adjacent to the magnetic pole axis.

8. The device according to claim 1, wherein the device comprises a first and a second magnet for providing the magnetic field, wherein the first and second magnets are distanced from each other by a first distance, and wherein the magnetic field sensor is positioned such that it is capable of sensing the magnetic field originating of both the first and the second magnet.

9. The device according to claim 8, wherein the magnetic field sensor is positioned at a position where a first magnetic field direction of a magnetic field component of the first magnet is different from a second magnetic field direction of a magnetic field component of the second magnet.

10. The device according to claim 8, wherein the first and second magnets are positioned such that magnetic pole directions of the first and second magnets are substantially anti-parallel.

11. The device according to claim 8, wherein the first and second magnets are positioned such that magnetic pole directions of the first and second magnets are substantially parallel.

12. The device according to claim 11, wherein the second sensing direction is substantially parallel to a top side of the device, the top side being opposite a base of the device and configured to be positioned at least partially below the wheel when the device is placed on or near the rail track, and wherein the second sensing direction is further substantially parallel to a mounting side of the device, the mounting side being configured for placing the device on the lateral side of the rail.

13. The device according to claim 8, wherein the device comprises a base and a top side opposite the base, wherein the first and second magnets are positioned substantially parallel to the top side, and wherein magnetic pole directions of the first and second magnets are substantially perpendicular to the top side.

14. The device according to claim 8, wherein the first distance is in the range of 20 to 200 mm, and wherein the magnetic field sensor is preferably positioned at substantially equal respective distances from the first and second magnets.

15. The device according to claim 14, wherein the at least one permanent magnet has a remanence of at least 5000 gauss, preferably at least 8000 gauss, more preferred at least 12000 gauss.

16. The device according to claim 8, wherein the at least one permanent magnet is configured such that the provided magnetic field is at least partially influenced by the wheel when the wheel is passing the device at a distance of at most 10 cm, and wherein the magnetic field sensor is positioned such that it senses the change in magnetic field caused by the wheel.

17. The device according to claim 16, wherein the magnetic field sensor is distanced from the at least one permanent magnet by a second distance that has a similar or same order of magnitude as a third distance between the at least one magnet and a nearest position of the wheel when the wheel passes the device when positioned on or near the rail track.

18. The device according to claim 8, wherein the magnetic field sensor is a two dimensional magnetic field sensor that senses two components of the magnetic field in first and second perpendicular sensing directions, and wherein the processor is configured to
obtain respective first and second pluralities of the magnetic field values for respective times from the magnetic field sensor for each respective first and second sensing direction;
analyse the obtained first plurality of magnetic field values by detecting whether the magnetic field values drop below a sixth threshold value, or rise above a seventh threshold value, indicating the presence of a wheel on the rail track passing the device; and
when the presence of a wheel is detected, analysing the second plurality of magnetic field values to determine the direction of motion along the rail track of the wheel.

19. The device according to claim 18, wherein the at least one processor is configured to
analyse the second plurality of magnetic field values to determine the direction of motion along the rail track of the wheel by estimating a peak position in the first plurality of magnetic field values, the peak position indicating a moment in time when the wheel is substantially above the device;
determine a sign of a first derivative of the second plurality of magnetic field values near the estimated peak position;
when the determined sign of the first derivative is positive, determine the direction of motion along the rail track of the wheel to be in a first direction along the rail track; and
when the determined sign of the first derivative is negative, determine the direction of motion along the rail track of the wheel to be in a second direction along the rail track.

20. The device according to claim 18, wherein the first sensing direction is substantially parallel to a top side of the device, the top side being opposite a base of the device and configured to be positioned at least partially below the wheel when the device is placed on or near the rail track, and wherein the first sensing direction is further substantially parallel to a mounting side of the device, the mounting side being configured for placing the device on the lateral side of the rail.

21. The device according to claim 1, further comprising at least one additional magnet for suppressing magnetic fields induced in the rail by rail vehicles passing the rail near device.

22. The device according to claim 1, comprising a top side opposite a base of the device and configured to be positioned at least partially below the wheel when the device is placed on the rail track, a mounting side configured for placing the device on the lateral side of the rail, wherein the at least one additional magnet functions as at least one mounting magnet for mounting the device onto the rail track, the at least one mounting magnet being positioned with a pole direction substantially perpendicular to the mounting side.

23. The device according to claim 21, wherein the at least one additional magnet is a permanent magnet having a remanence of at least 5000 gauss, preferably at least 8000 gauss, more preferred at least 12000 gauss.

24. The device according to claim 1, wherein the device comprises a single magnetic field sensor.

25. The device according to claim 1, further comprising a network interface for transmitting the obtained direction of motion along the rail track of the wheel, wherein preferably the network interface is a wireless network interface.

26. The device according to claim 1, further comprising a sensor for detecting motion, such as an acceleration sensor, wherein the at least one processor is configured to
obtain a motion value indicative for a motion of the device; and to
only enable the magnetic field sensor to sense magnetic field values when the motion value exceeds a predefined threshold indicating that a vehicle comprising a wheel for the rail track is approaching in order to thereafter perform the steps of obtaining and analysing.

27. The device according to claim 1, further comprising energy storage means for providing electric power to the device.

28. A method of detecting a wheel on a rail track, the method being carried out in a device comprising at least one permanent magnet for providing a magnetic field; a magnetic field sensor for sensing a magnetic field value indicative for a flux density, or a change in the flux density, of the provided magnetic field; and at least one processor in communication with the magnetic field sensor, the method comprising the at least one processor performing the steps of:
obtaining a plurality of the magnetic field values for respective times from the magnetic field sensor; and
analysing the obtained plurality of magnetic field values such that a direction of motion along the rail track of a wheel passing the device is obtained.

29. The method according to claim 28, wherein a device according to the following limitations is used;
at least one permanent magnet for providing a magnetic field;
a magnetic field sensor for sensing a magnetic field value indicative for a flux density, or a change in the flux density, of the provided magnetic field;
at least one processor in communication with the magnetic field sensor, wherein the at least one processor is configured to:
obtain a plurality of the magnetic field values for respective times from the magnetic field sensor; and to
analyse the obtained plurality of magnetic field values such that a direction of motion along the rail track of a wheel passing the device is obtained.

30. A computer program product comprising computer-executable instructions for performing the method of claim 28, when the program is run on the device according to the following limitations;
at least one permanent magnet for providing a magnetic field;
a magnetic field sensor for sensing a magnetic field value indicative for a flux density, or a change in the flux density, of the provided magnetic field;
at least one processor in communication with the magnetic field sensor, wherein the at least one processor is configured to:
obtain a plurality of the magnetic field values for respective times from the magnetic field sensor; and to
analyse the obtained plurality of magnetic field values such that a direction of motion along the rail track of a wheel passing the device is obtained.

* * * * *